United States Patent [19]

Kanai et al.

[11] 4,353,102

[45] Oct. 5, 1982

[54] THIN-FILM MAGNETIC HEAD

[75] Inventors: Kenji Kanai, Neyagawa; Nobuyuki Kaminaka, Moriguchi; Noboru Nomura, Kyoto; Norimoto Nouchi, Katano, all of Japan

[73] Assignee: Matsushita Electric Industrial Co., Ltd., Kadoma, Japan

[21] Appl. No.: 165,941

[22] Filed: Jul. 3, 1980

[30] Foreign Application Priority Data

Jul. 4, 1979 [JP] Japan ............................... 54-85202
Nov. 20, 1979 [JP] Japan ............................. 54-151046

[51] Int. Cl.³ .................... G11B 5/22; G11B 5/20; G11B 5/25
[52] U.S. Cl. ............................ 360/126; 360/125; 360/123; 360/119
[58] Field of Search ............... 360/126, 127, 125, 123, 360/119, 122

[56] References Cited

U.S. PATENT DOCUMENTS

| | | | |
|---|---|---|---|
| Re. 29,326 | 7/1977 | Lazzari et al. | 360/125 |
| 3,846,842 | 11/1974 | Lazzari | 360/126 |
| 4,016,601 | 4/1977 | Lazzari | 360/127 |
| 4,127,884 | 11/1978 | Nouchi et al. | 360/127 |
| 4,190,872 | 2/1980 | Jones et al. | 360/125 |
| 4,219,854 | 8/1980 | Church et al. | 360/125 |
| 4,242,710 | 12/1980 | Hempstead et al. | 360/126 |

*Primary Examiner*—Alfred H. Eddleman
*Attorney, Agent, or Firm*—Wenderoth, Lind & Ponack

[57] ABSTRACT

A thin-film magnetic head constructed in the manner that a magnetic circuit is composed of a base of magnetic material and a thin-film magnetic core layer, which form an operating gap at the front end thereof and a rear junction at the rear end of the magnetic core layer, and a conductor layer forming a winding is provided between the base and the magnetic core layer. The magnetic core layer has a larger width at the portion where it crosses over the conductor layer, than at the operating gap portion, whereby magnetic fluxes generated by electric current flowing through the conductor layer are effectively passed through the magnetic core layer and so recording efficiency is improved.

5 Claims, 11 Drawing Figures

4,353,102

THIN-FILM MAGNETIC HEAD

BACKGROUND OF THE INVENTION

The present invention relates to a magnetic head of a thin-film structure and more particularly relates to such a head which can be operated at an improved high recording efficiency.

The recent tendency toward increased high-density requirements in the art of magnetic recording calls for introduction of a smaller track width such as below 20μ and a greater operating frequency such as 10 MHz or more. In the light of these problems of manufacturing and function, possibilities of conventional magnetic head construction using such bulk material as ferrite are very limited, and accordingly thin-film magnetic head techniques are much called for.

A conventional method used in constructing a thin-film magnetic head composed of electrically-conductive, insulating, and magnetic thin films is such that, as shown in FIG. 1A and 1B, an electrically-conductive material layer 1 is formed on a base magnetic layer, that is, a magnetically-flat magnetic substrate 2 or a magnetic thin-film layer, with an insulating layer 3 interposed therebetween, and a magnetic thin-film layer 4 is laid on the top, with an insulating layer 5 interposed between the conductive material layer 1 and magnetic thin-film layer 4, forming an operating gap area A at the front portion.

In such a construction, the magnetic layers 2 and 4 adjacently face each other and the magnetic layer 4 is substantially thin; and these facts are likely to cause magnetic saturation and make it difficult to operate such a head in with sufficient efficiency as a recording head. Moreover, if such a thin-film magnetic head is to be employed for both recording and reproducing operations, it is necessary to increase the number of windings in order to obtain sufficient reproducing voltage. However, since multi-layer construction of the windings may entail a number of manufacturing problems such as increased number of processes and decreased yield, it is desirable to have the windings formed in a plane. Thus, the length of magnetic core portion crossing over windings tends to expand, resulting in a decrease of core efficiency for a magnetic head because of increased magnetic flux leakage.

Where the width of a magnetic layer 4 is uniformly distributed as shown in FIG. 1, the magnetic flux distribution in the magnetic thin-film takes such a pattern as seen in FIG. 2. That is, flux $\phi$ is at its maximum value $\phi_m$ at the rear junction where Y=0 and diminishes substantially before it reaches the operating gap at the front end. This means that the magnetic flux is not effectively transferred to the operating gap.

To overcome this difficulty, it is desirable to obtain a uniform distribution of magnetic fluxes over the region in which a conductor layer used for the windings is present, so that magnetic fluxes at such a uniform value can be passed on to the operating gap.

As an approach to solve such problem, there has been proposed to use a thin-film magnetic head of such a type as shown in FIG. 3. This thin-film magnetic head is such that there is provided a groove 6 in a magnetic substrate 7, the groove 6 being filled with non-magnetic materials 8 such as glass and an electrically conductive material, whereby the distance between the opposed part enclosing the conductor layer 1 of the magnetic substrate 7 and the magnetic layer 4 is enlarged so as to reduce magnetic flux leakage and thereby improve magnetic core efficiency. With the exception of the above point, the magnetic head is of same construction as that shown in FIG. 1.

Even with such a thin-film magnetic head, however, it was difficult to obtain sufficient recording efficiency.

SUMMARY OF THE INVENTION

It is an object of the present invention to provide a thin-film magnetic head which can be operated at improved high recording efficiency, even with a narrow operating gap.

To achieve the object, in a thin-film magnetic head according to the present invention, a magnetic core layer for forming a magnetic circuit in conjunction with a magnetic substrate is constructed in the manner that it has larger width at the area where it crosses over a conductor layer forming a winding, than at the area where an operating gap is formed, whereby magnetic fluxes are passed to the operating gap with significantly reduced leakage.

BRIEF DESCRIPTION OF THE DRAWINGS

FIG. 1A is a perspective view thereof and FIG. 1B is a sectional view along the line I—I of FIG. 1A;

FIG. 6 is a perspective view, and FIG. 7 is a plan view;

FIG. 8a is a schematic sectional view of important parts of the head, and FIG. 8b is a graph illustrating the characteristic curve.

DETAILED DESCRIPTION OF THE INVENTION

Figure 3:
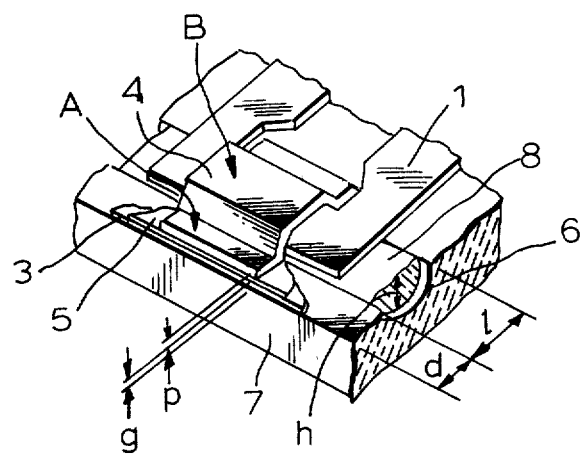
FIG. 3 is a perspective view of another thin-film magnetic head proposed prior to the present invention.
Figure 4:
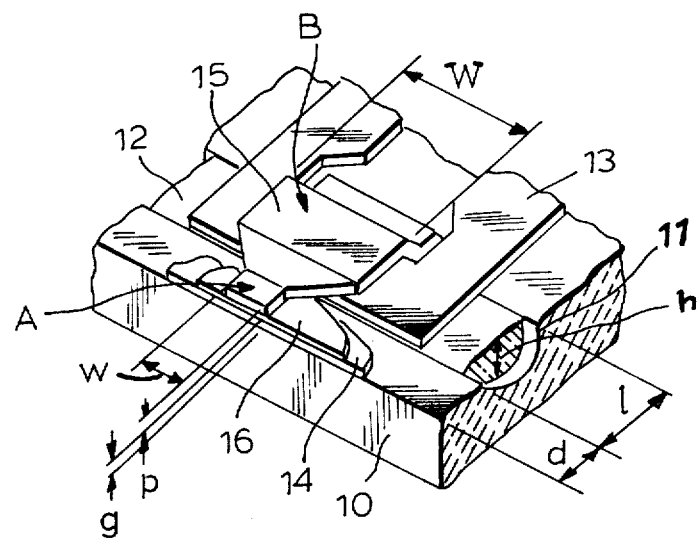
FIG. 4 is a perspective view of a thin-film magnetic head according to the present invention.

Referring to FIG. 4, a magnetic substrate 10 has a groove 11 cut therein and the groove is filled with a non-magnetic material 12. A conductor layer 13 of electrically-conductive material which is used to construct a winding is formed on the magnetic substrate 10, with an insulator layer 14 interposed therebetween. On the conductive material layer 13 is provided a magnetic core layer 15, with an insulator 16 interposed therebetween, so as to form a magnetic circuit in conjunction with the magnetic substrate 10. In this magnetic head, the aspects of its construction other than the magnetic core layer 15 are similar to those of the above-mentioned prior-proposed thin-film magnetic head of FIG. 3. The magnetic core layer 15 has larger width W at the across-the-conductor portion B where the magnetic core layer crosses over the conductor layer 13 than at the operating gap portion A. The width W of the portion B is narrowed toward the gap portion A. The gap portion A has uniform width w.

Figure 1A:
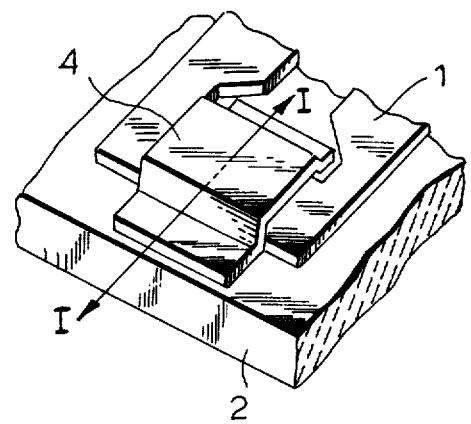
FIGS. 1A and 1B illustrate a conventional thin-film magnetic head.
Figure 1B:
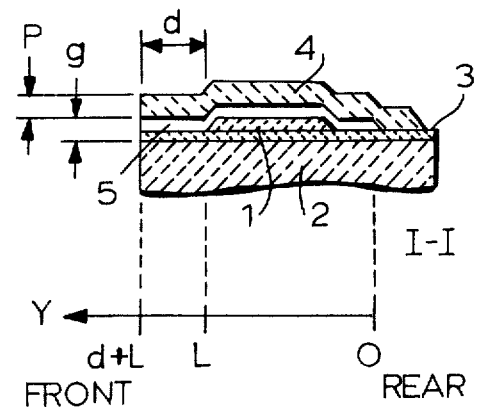
Figure 2:
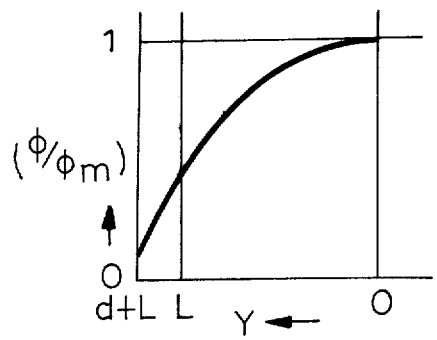
FIG. 2 is a graph showing a magnetic flux distribution in a magnetic core layer of the magnetic head of FIG. 1.
Figure 5:
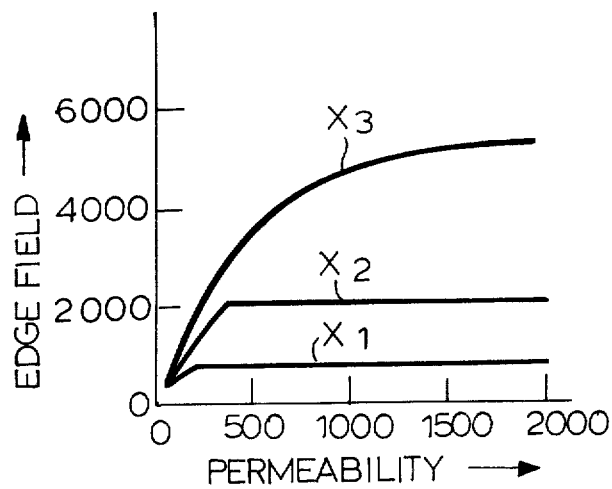
FIG. 5 is a graph illustrating relations between the edge field and the permiability of a magnetic core layer in the conventional and invention heads.

As a result of the above described construction, magnetic saturation is unlikely to occur at the portion B of the magnetic layer 5 and a much higher recording efficiency is obtainable. These advantages will be explained with reference to FIG. 5. FIG. 5 gives characteristic curves for comparing the above-mentioned heads with respect to their recording efficiency, with the permeability $\mu$ of magnetic core layer along the abscissa and the edge field $H_e$ at the front end of the gap portion A along the ordinate. Curve $X_1$ shows the characteristics of the magnetic head of FIG. 1 where the gap length $g=12$ $\mu$m, the gap depth $d=10$ $\mu$m, the thickness p of the magnetic core layer $=3$ $\mu$m, and the applied magnetomotive force $U=0.6$ $AT_{op}$. Curve $X_2$ shows the characteristics of the earlier-proposed improvement of FIG. 3 where the conditions that a groove depth $h=20$ $\mu$m and a groove width $l=200$ $\mu$m are added to the above-mentioned conditions. Curve $X_3$ shows the characteristics of the embodiment of the invention where in addition to the same conditions as those for Curve $X_2$, the condition that ratio of the width w of gap portion A of magnetic core layer to width W of across-the-conductor portion B, or $w/W=0.25$ is applied. It can be clearly seen from FIG. 5 that the embodiment of the invention shows substantial improvement in recording efficiency over the other heads.

According to the above-mentioned structure, the magnetic core layer has the width of the operating gap area only in a small part. Therefore, such a structure is advantageous in attempting narrow track recording by decreasing the gap width of the magnetic head, because the region of the magnetic core layer requiring minute processing is reduced compared with the case where the magnetic core layer has the same width along the entire region. Such a construction also improves the manufacturing yield. Such an advantage is particularly great in the case of the gap width being less than 10 $\mu$m because even in such a case, the magnetic core layer is required to have a thickness of several $\mu$m and so minute processing is extremely difficult. The construction having only a small part of small width reduces the problem of effective-core-section decreasing due to edge slanting at the time of photoetching.

The uniform width of the gap portion A is for keeping the gap width constant even if the gap depth is varied.

With respect to reproducing, the magnetic core efficiency is high because the flux leakage at the gap portion is small, so that it is able to get sufficient output voltage.

Such a thin-film magnetic head is adaptable for use as head for tape recording and a flying head for disc mediums, etc. Particularly when used for a recording medium having thick magnetic-material coating, it provides considerable improvement in characteristics, being effective for overwrite modulation and for reduction of dropout.

Figure 6:
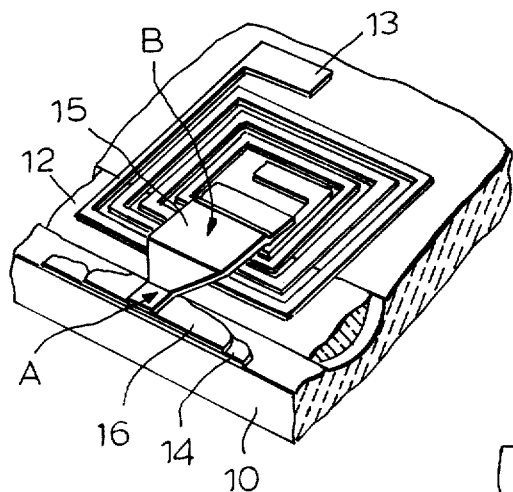
FIGS. 6 and 7 illustrate another embodiment of the invention.
Figure 7:
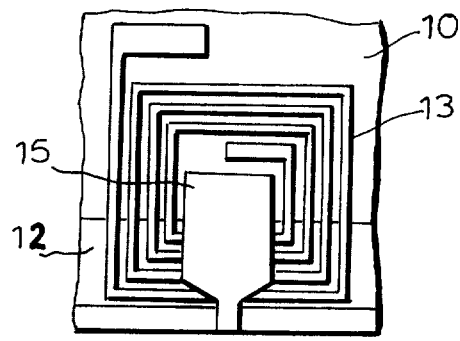

Another embodiment of the invention is shown in FIGS. 6 and 7. This thin-film magnetic head enables a high reproduction voltage through the use of a spiral arrangement of conductor layer 13. In other respects, it is same as the earlier described embodiment as to both construction and operational effect. It is also comparable to the other embodiment as to the relation of the edge magnetic field $H_e$ at front end of the gap to the permeability $\mu$ of magnetic layer 15.

Figure 8A:
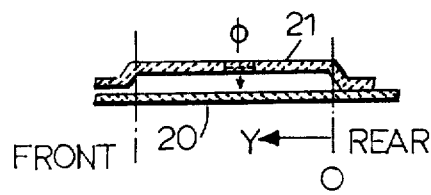
FIGS. 8a and 8b are for explaining characteristics of a magnetic head according to the invention.
Figure 8B:
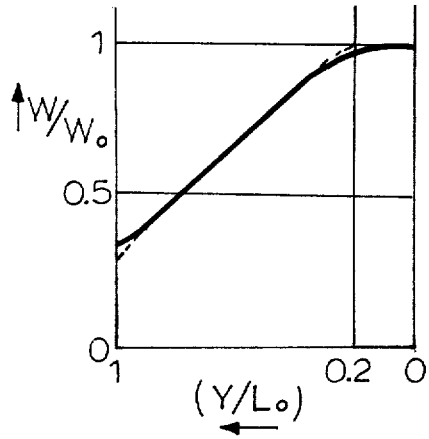

The present invention will now be explained as to its more specific applications. In such a sectional configuration as shown in FIG. 8a, in order to meet condition necessary for permitting uniform distribution of magnetic fluxes when magnetic fluxes pass through magnetic layers 20 and 21 while leaking between magnetic layers 20 and 21, the relationship between $W/W_o$ and $Y/L_o$ must be a curve as shown in FIG. 8b wherein $W/W_o$ and $Y/L_o$ are normalized values of the width W of magnetic layer and the distance Y from the rear junction respectively, $W_o$ is the width of the layer at the rear junction, and $L_o$ is the characteristic length of the layer. Assuming the specific permeability of the magnetic thin film is $\mu$, the thickness is p, and the distance between magnetic layers is h, the characteristic length $L_o$ is given by the following formula:

$$L_o = \sqrt{\mu p h}$$

Figure 9:
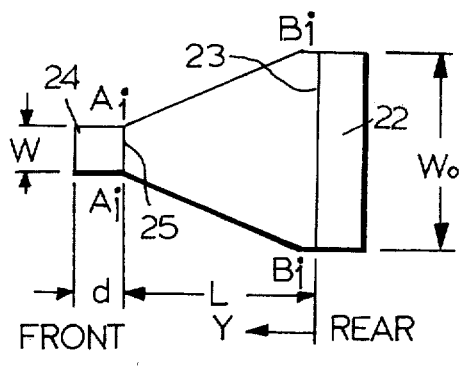
FIG. 9 is a schematic plan view of a magnetic core layer for explaining the present invention.

FIG. 9 shows top plan view of a principal part of an embodiment of the invention. By way of example, its configuration is determined in the following way. The characteristic curve shown in FIG. 8b is approximated by a straight line having inflection points at intersecting points of tangent of the curve as shown by the broken line. If the approximate line is taken as the basis for determining the width variation of the magnetic layer, it is necessary that inflection points $B_i$ and $B_i$ nearer to the rear junction 22 should be located between the front end 23 of the junction 22 and 0.2 $L_o$ forward of said front end 23. In practice, the points $B_i$ and $B_i$ may be located further toward the rear than the halfway point between the front end 23 of the rear junction and the rear end 25 of the operating gap 24. Inflection points $A_i$ and $A_i$ in the operating gap portion 24 may be located so as to agree with the rear end 25 of the gap 24, or within 0.2 $L_o$ rearward of said rear end. Thus, the width of the magnetic layer on the side of operating gap is small and the width of the magnetic layer on the rear junction side is large, with at least two inflection points provided over the distance L between the operating gap and the rear junction.

From the standpoint of core efficiency, length L is preferably smaller, but a small signal-winding region makes it difficult to obtain a multi-winding arrangement, resulting in a too small reproduction output voltage. Furthermore, in order to realize a narrower track, it is necessary to have a $W/W_o$ value of $\frac{1}{3}$ or so as shown in FIG. 8b, or otherwise there may arise some other problems relating to photoetching and core efficiency. The embodiment of the present invention exhibited good characteristics, with $L \simeq L_o$.

What is claimed is:

1. A thin film magnetic head comprising a base of magnetic material, a magnetic core layer forming a head core structure in conjunction with said base so as to provide an operating gap portion at the front end of the head, and a rear junction at the rear end of the magnetic core layer, and a conductor layer forming a winding of the head for activating said head core structure;

wherein said magnetic core layer has a smaller width at said operating gap portion and a larger width at a back region which crosses over said conductor layer, the thickness of the magnetic core layer being substantially constant; and wherein a groove is formed in said base, said groove being filled with a non-magnetic material above which said magnetic core layer and said conductor layer cross each other.

2. A thin-film magnetic head as claimed in claim 1, wherein the width at the part of said magnetic core layer where the magnetic core layer crosses over the conductor layer gradually decreases toward said gap portion.

3. A thin-film magnetic head as claimed in claim 1, wherein said conductor layer is arranged in spiral form in a plane.

4. A thin-film magnetic head as claimed in claim 1, wherein said magnetic core layer has at least two inflection points over the width thereof, wherein said inflection point is defined as an intersecting point of tangents of the magnetic core layer outline, a first one of said at least two inflection points being provided at a location which is more to the rear than halfway between the front end of said rear junction and the rear end of said operating gap, and a second inflection point being located between the rear end of said operating gap and 0.2 L backward of said rear end, wherein L is defined to be the distance between the rear end of said operating gap and the front end of said rear junction.

5. A thin-film magnetic head as claimed in claim 4, wherein said first inflection point is located between the front end of the rear junction and 0.2 L forward of said front end.

* * * * *